Patented June 14, 1932

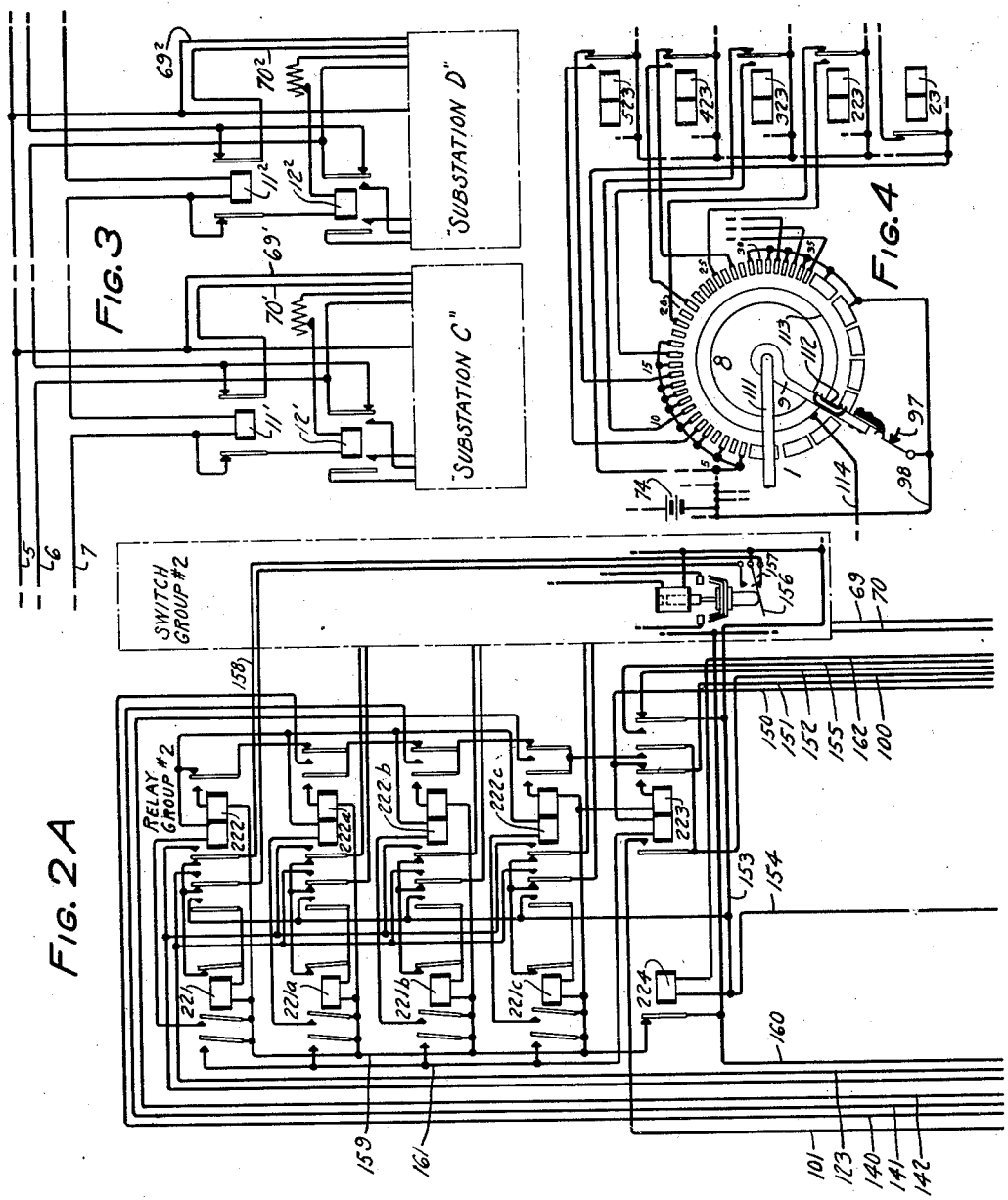

1,863,089

UNITED STATES PATENT OFFICE

JOSEPH C. FIELD, OF MAPLEWOOD, NEW JERSEY, ASSIGNOR TO BELL TELEPHONE LABORATORIES, INCORPORATED, OF NEW YORK, N. Y., A CORPORATION OF NEW YORK

REMOTE CONTROL SYSTEM

Application filed December 28, 1927. Serial No. 243,031.

This invention relates to controlling and supervisory systems and more particularly to such systems in which switches or other apparatus may be remotely controlled and supervised.

An object of the invention is to simplify and reduce the mechanical operations at a remote station and perform the various controlling operations in a remote control system in a rapid and accurate manner and with a minimum number of operating elements.

In accordance with this invention power switches at a plurality of outlying substations may be controlled from a central station by a number of code keys and the position of the switches indicated at a central station by means of lamps. More specifically the power switches at an outlying station are controlled by the selective operations of various sets of relays and a rotary distributor.

In one embodiment of the invention there is provided at the substation a set of relays and a rotary distributor common to not more than twenty power switches. The power switches are associated in groups of four and each group of switches is controlled by a set of relays in which two relays are associated with each switch for causing the position of the switch to be transmitted to the central station through the operating of relays common to the switches at the substation and other apparatus at the control station. The operation of any switch at the substation either through the controlling means at the central station or by conditions on the power line, establishes circuit connections through the group relays of the switch and certain relays in the common group, to send a series of impulses determined by the segments on the distributor to the central station where the position of the switch is indicated by a lamp.

A feature of the invention relates to the control of the sets of relays associated with each switch by means of a single relay which determines the sequence in which the checking signals from the group of switches may be transmitted to the central station, and determines the impulse code for each switch in a particular group.

Another feature relates to the checking of the positions of the power switches to insure correct indication at the central station. In accordance with this feature a relay is provided for each group of switches and is controlled from the central station over a separate selector circuit to check the positions of the switches automatically in sequence and requires no further operation by the attendant at the central station other than starting the preliminary operation of the checking selector at the substation. Furthermore, the single selector circuit may be employed for a plurality of groups of switches at a particular substation provided there is a check control relay associated with each group of switches.

Another feature of the invention relates to the disconnection of all the selectors at all the remote stations from the line conductors to the central station when any of the remote stations are ready to send answer-back signals to the central station. This is accomplished by a single relay at each of the remote stations which when selectively operated disconnects all the selectors from the line at other remote stations and also disconnects the selectors at the signaling remote station. This arrangement prevents any interference with the answer-back signal from the signaling remote station and also prevents interference with the impulse control relay at the central station. Furthermore, when a large number of selectors are connected to the central station over the line conductors thereby necessitating a large number of code combinations for selectively operating the selectors, the disconnection of the selectors from the line when an answer-back signal is being sent to the central station provides the advantage of duplicating the code combination for the answer-back signals.

These and other features of the invention will be clearly understood from the following detailed description and the accompanying drawings.

Fig. 2A illustrates a second group of relays associated with another group of four switches.

Fig. 3 shows the coupling of other substations to the common line from the central station, it being understood that each substation is identical, and Fig. 4 is another diagrammatic view of the rotary distributor shown in Fig. 2 illustrating the connection of the segments for transmitting different sets of impulses for five groups of switches at a single substation.

Figure 1:
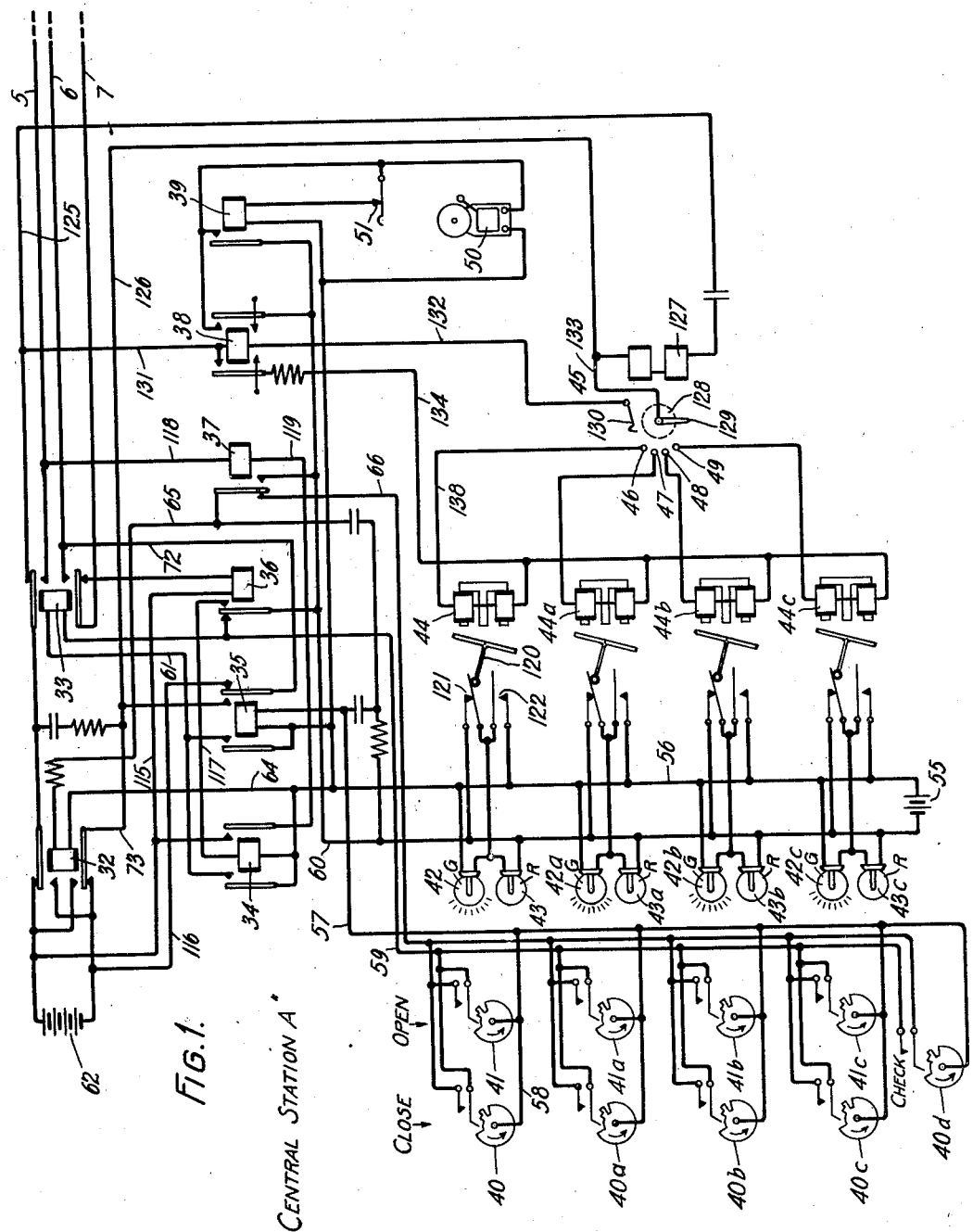
Fig 1 illustrates diagrammatically the control and indicating equipment at a central station.
Figure 2:
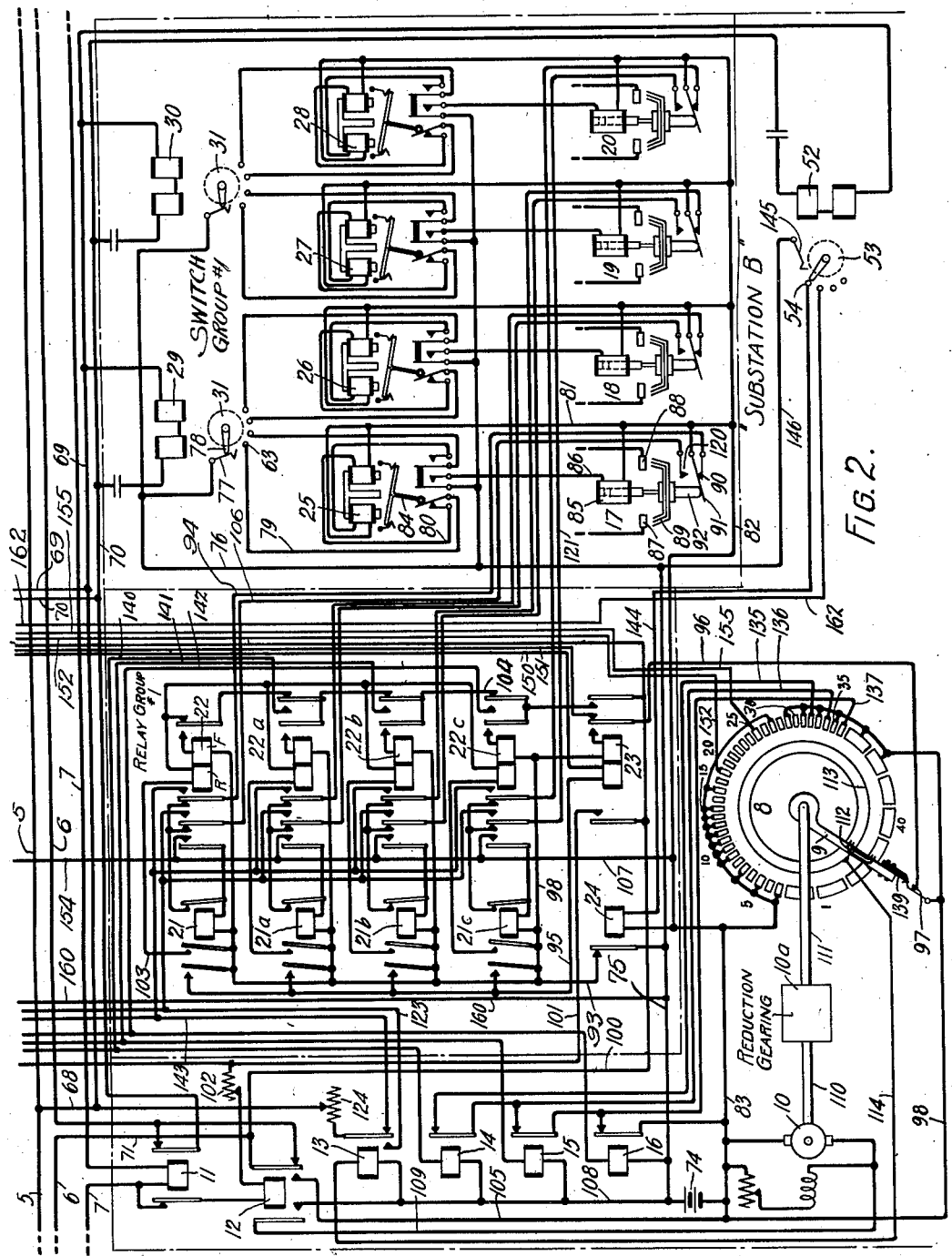
Fig. 2 shows the various groups of apparatus at a remote station, the control group of relays and a distributor being common to the operation of twenty switches, and a relay group being associated with four switches.

Referring to the drawings, central station A, in Fig. 1 is connected to a plurality of remote stations, such as substations B, C and D shown in Figs. 2 and 3, by line conductors 5, 6 and 7. At each substation are a number of power switches and the controlling apparatus for changing the position of the switches and completing circuit conditions to the central station for indicating the position of the switches. For the purpose of this invention the apparatus at substation B will be described, it being understood that all the substations connected to the central station over line conductors 5, 6 and 7 contain similar equipment.

A distributor 8 consisting of a number of insulated segments around the periphery of its stationary faceplate, a revolving arm 9 of the distributor connected to a motor 10 by a shaft, and a reduction gear arrangement 10a, comprise the mechanical equipment for producing code impulse combinations controlled by a large number of switches at substation B. Associated with the distributor 8 are the common control relays 11 to 16 inclusive for controlling the different operations for all the switches at the substation. Four power switches 17, 18, 19 and 20 are shown at substation B which are controlled and supervised from the control station A. While four switches have been shown it is understood that a large number of switches may be supervised at a particular substation. The capacity of the system in accordance with this invention is controlled by the different code combinations which may be devised for the segments on the distributor 8. The distributor and the control relays shown at substation B are common to the station for not more than twenty switches.

Ten relays comprising relay group No. 1 are associated with the group of four switches, namely power switches 17 to 20 inclusive, in which a pair of relays 21 and 22 are individual to power switch 17, relays 21a and 22a are individual to power switch 18, relays 21b and 22b are individual to power switch 19 and relays 21c and 22c are individual to power switch 20. A group control relay 23 in relay group 1 determines the sequence in which the indication of the position of the switches may be sent in to the central station during the checking operation and also determines the code setting for each group of switches. Relays 25, 26, 27 and 28 are respectively connected to the power switches 17, 18, 19 and 20 and are energized by a pair of selectors 29 and 30, selector 29 controlling relays 25 and 26, and selector 30 controlling the operation of relays 27 and 28. These selectors are preferably of the type disclosed in my Patent 1,343,256 issued June 15, 1920, and consist essentially of an electromagnet energized by pulses of alternating current to advance a step-by-step element or wheel 31, to a definite position according to the setting of the code of impulses determined for the selector. Each selector is operated by a different set of impulses so that a large number of selectors may be controlled from the central station over an individual line. Similarly ten relays 221 to 221c, 222 to 222c, 223 and 224 comprising relay group No. 2, are connected to switch group No. 2 to the common control relay group 12 to 16 and the distributor 8.

At central station A shown in Fig. 1 is located the controlling and supervising equipment for the power switches at any number of substations connected to the line. This equipment comprises a series of control relays shown at the top of Fig. 1 in which relays 32 and 33 provide means for connecting a source of current to the line conductors 5 and 6 for operating the selectors located at the various substations. Relays 34 to 39 inclusive perform various operations to be hereinafter described. These control relays are common to any number of switches at the particular substation and are also common to a number of substations connected to the line extending from central station A. Certain of the control relays at the central station are operated by impulse senders, such as keys 40 and 41, contained in a cabinet on the dispatcher's desk at the control station. These keys are of the general type disclosed in my Patent 1,306,054 issued June 10, 1919, and are adapted to transmit series of impulses to operate the selectors at the substations. In accordance with this invention two impulse senders or keys are provided for each switch at the substations. For instance, if power switch 17 at substation B is in open position the operation of key 40 will operate the switch to its closed position through selector 29 and auxiliary relay 25, while key 41 controls the opening of switch 17 through the same selector and auxiliary relay. Only eight keys are shown in the drawings for operating a group of four switches located at substation B, it being understood that additional keys, lamps and a selector are to be added to the central station equipment for each group of four switches at a substation.

The positions of the switches at substation B are indicated at the central station by means of lamps 42 and 43 which are illuminated by the operation of a polarized relay 44 which is energized by the advancement of selector 45 to any one of the contacts 46 to 49 inclusive. The lamps indicate to the dispatcher the position of the switches at substation B, the green lamp 42 representing that switch 17 is in an open position and red lamp 43 when lighted indicating that the switch 17 has changed to a closed position. For the purpose of this invention only a sufficient number of impulse keys and indicating equipment is shown to supervise the operation of the four switches shown in substation B, although it is understood that additional sets of keys, lamps, polarized relays and selectors are required for each set of four switches to be supervised. When any switch at the substation changes position an alarm is given at the central station to call the dispatcher's attention to the changed condition. This is accomplished by a bell 50 which rings until the circuit is broken by the dispatcher operating key 51.

It is often necessary to ascertain whether the equipment for performing the various operations of controlling the position of the switches and indicating their position is operating correctly and efficiently so that if any trouble exists it may be remedied as soon as possible. This is accomplished in accordance with this invention by a checking circuit in which a minimum of apparatus is employed for performing the checking operation. A single impulse sender or key 40a at central station A is provided to operate a selector 52 at substation B, to advance the step-by-step element 53 to one of the contacts on the selector. The advancement of the element 53 to contact 54 operates checking relay 24 in relay group No. 1, to automatically start the sending of the four sets of code impulses to the central station in sequence, to indicate the actual position of the four switches at substation B without operating the switches. If there is more than one relay group of four switches, the circuit may be arranged so that each checking relay 24 of a relay group is connected to one of the other contacts of selector 52 as shown in Figs. 2 and 2A.

Since the common control relays and relays in relay group No. 1 at substation B perform numerous functions it is believed a better understanding of the invention will be had if these functions are described in their sequence of operation. The following description of the operation of the system will therefore be described under the following steps.

1. Dispatcher changing position of switch at substation.
2. Answer-back signal from substation to central station.
3. Automatic checking of position of switches.

1. *Dispatcher changing position of switch at substation*

The operation of the system is as follows. The power switch 17 at substation B is in an open position as shown and the green lamp 42 at control station A is lighted to indicate this condition. Suppose it is desired to operate power switch 17 to its closed position. This is accomplished by the attendant at control station A rotating impulse sender or key 40, in a counter-clockwise direction as indicated by the arrow whereupon the key is released to send a series of impulses over the line to operate selector 29 at substation B. When the impulse key 40 begins to rotate the lower contact engages the disc and closes a circuit for the operation of control relay 35. This circuit may be traced from one side of battery 55, conductor 56, winding of relay 35, conductors 57 and 58, disc and lower contact of key 40, conductor 59, back contact and armature of relay 36, conductor 60 to the other side of battery 55. When relay 35 operates it closes a circuit for the operation of line relay 33. This circuit may be traced from battery 55, conductor 56, closed left-hand armature and contact of relay 35, conductor 61, winding of line relay 33, normally closed back contact and armature of relay 36, conductor 60 to battery 55. Relay 33 in operating connects the main battery 62 at central station A to the line conductors 5 and 6 over the upper armature and front contact of relay 33 and the front contact and right-hand armature of operated relay 35 and conductor 72. The selectors 29, 30 and 52 at substation B and all the selectors at other substations connected to line conductors 5 and 6 are ready to receive impulses for advancing the step-by-step elements of the respective selectors to a definite position. Assuming the code of impulses sent over the line by key 40 corresponds to the code setting of selector 29 whereby the arm 78 thereof is advanced step-by-step to engage terminal 63 to operate auxiliary relay 25. As key 40 continues to rotate it makes and breaks the circuit heretofore described through its contact and spring, thereby alternately energizing and deenergizing reversing relay 32 associated with the main battery source 62. This circuit may be traced from battery 55, conductors 56 and 64, winding of reversing relay 32, conductor 65, normally closed armature and back contact of relay 37, conductor 66, contact and spring of key 40, conductor 59, normally closed back contact and armature of relay 36, conductor 60 to battery. The energizing circuit for selector 29 at substation B may be traced from the positive side of battery 62, upper back contact and armature of relay 32, upper armature and front contact of relay 33, line conductor 5, conductors 68 and 69, winding of electromagnet of selector 29, conductor 70, normally closed right-hand armature and contact of line relay 11, normally closed right-hand armature and back contact of relay 12, conductor 71, line conductor 6, conductor 72, right-hand armature and front contact of relay 35, conductor 73, and the lower armature and back contact of relay 32 to battery 62.

The step-by-step element 31 of selector 29 is only advanced when current pulses of opposite polarity are sent over the line conductors. Therefore, the energization and deenergization of reversing relay 32 causes current of opposite polarity to be transmitted to the selector by reversing the connections to the main battery 62. This is accomplished by sending a positive pulse over the line when relay 32 is not operated and then sending a negative pulse when the armatures of relay 32 are operated to the two front contacts. When the desired number of pulses have been sent to advance the arm 78 on selector element 31 to terminal 63 a circuit is established for the operation of auxiliary relay 25. This circuit may be traced from battery 74, conductors 75 and 76, spring 77, element 31, arm 78, terminal 63, conductor 79, normally closed left-hand spring and contact of relay 25, conductor 80, right-hand winding of relay 25, conductors 81, 82 and 83 to battery 74. When the right-hand winding of relay 25 is energized the pivoted armature is drawn toward the right-hand pole face of relay 25 and is mechanically locked in this position. This results in the arm 84 on the armature breaking the circuit established for the operation of the relay and completing a circuit for the operation of solenoid 85 through the middle contact and spring of relay 25. This circuit may be traced from battery 74, conductors 75 and 76, operated middle spring and contact of relay 25, conductor 86, winding of solenoid 85, and conductors 81, 82 and 83 to battery. When the solenoid 85 is energized it draws up the armature of the switch 17 to close the power circuit through the bus bar terminals 87 and 88 and contact arm 89 of switch 17. Upon the complete revolution of key 40 at the central station, the lower spring will be disengaged from the disc thereby opening the circuit of control relay 35 and line relay 33 and releasing selector 29 which will be returned to normal position as will be clear from Patent 1,343,256 mentioned above. In order to prevent the possibility of the control relay 12 at substation B operating when a call is being made from the central station A, due to the capacity between the line conductors 5, 6 and 7, the circuit is so arranged that when a key is operated at the central station, thereby operating line relay 33, control relay 35, a short circuit is established between line conductors 6 and 7 by the lower front contact of line relay 33. This short circuit between line conductors 6 and 7 prevents the momentary operation of the control relay 12 at substation B through the capacity to line conductor 7 due to the reversal of the selector impulse on the line conductors 5 and 6.

*2. Answer-back signal from substation to central station*

As the armature of switch 17 moves upward through the winding of the solenoid 85 it opens the battery circuit for control relay 21 through the contact 90 and spring 91 which is carried by the extension 92 on the armature of switch 17. The momentary opening of the battery circuit through the lower contact and spring of switch 17 causes control relay 21 which is normally energized to deenergize. The holding circuit for control relay 21 may be traced from battery 74, conductor 75, normally closed armature and contact of relay 24, conductor 93, winding of relay 21, right hand armature and contact of relay 21, normally closed inner left back contact and inner left armature of associated relay 22, conductor 94, contact 90, spring 91, conductors 81, 82 and 83 to battery 74. Relay 21 therefore deenergizes upon the opening of the contact 90 and the spring 91, and in releasing causes group control relay 23 to be energized. The energizing circuit for this relay may be traced from battery 74, conductor 75, normally closed armature and contact of relay 24, conductor 93, outer left armature and contact of deenergized relay 21, conductor 95, rear windings of control relay 23, conductor 150, normally closed back contact and inner right hand armature of relay 223 in Fig. 2A, conductor 151, normally closed back contact and inner right hand armature of relay 23, Fig. 2, conductor 96, contact and spring 97, conductor 98 to battery 74. When control relay 23 operates it draws up the left and right hand armatures and forms a locking circuit for itself through the front winding and inner right front contact and inner right hand armature. The source of current, such as battery 74, is disconnected from other control relays, such as relay 223, in relay group No. 2 at substation B through the left contact and inner right hand armature of relay 23 in relay group #1 and conductor 151, to prevent the transmission of impulses from all other groups of switches at substation B to the central station A until the series of impulses determined for power switch 17 have been transmitted. Relay 23 in operating also prepares a circuit for the operation of control relay 12 through its outer left hand armature and contact and conductor 101, to start the rotary distributor 8 and thereby initiate the sending of the individual codes of impulses for the switches in group No. 1. At the same time a circuit is completed from line conductor 6 to line conductor 7 and control relay 12 is operated if the line is not being used by any other substation. Relay 12 is energized over a circuit from battery 62 at control station A, conductor 115, winding of control relay 36, normally closed lower back contact and lower armature of relay 33, line conductor 7, normally closed left hand contact and armature of line disconnect relay 11, winding of control relay 12, variable resistance 102, conductor 101, outer left contact and outer left hand armature of operated relay 23, conductor 100, conductor 71, line conductor 6, conductor 72, normally closed right hand armature and back contact of relay 35, conductor 116 to battery 62. Control relay 12 in operating opens line conductor 6 to the other substations connected to central station A over its operated right hand armature and front contact to disconnect all the selectors at other substations from the line and thereby prevent interference with the answer-back signal being sent from substation B. This relay also disconnects the selectors at substation B from the line. Where there are a large number of selectors connected to the line the advantage of this arrangement is that the code settings may be duplicated without interference with the operation of the system. Control relay 12 also supplies battery to relay 22 associated with switch 17 through its operated right hand armature and front contact. Upon the completion of the energizing circuit for control relay 12, associate relay 22 will operate over a circuit which may be traced from battery 74, conductor 75, normally closed armature and contact of relay 24, conductor 93, inner left hand armature and contact of deenergized relay 21, rear winding of relay 22, normally closed back contact and right hand armature of relay 22, the normally closed back contacts and outer right hand armatures of relays 22a, 22b, and 22c, outer front contact and outer right hand armature of operated control relay 23, conductor 100, right hand armature and front contact of operated control relay 12, conductor 105 to battery 74. Relay 22 in operating also locks up through its front winding and right front contact and armature and cuts off battery to the other 22 type relays through its open right back contact. When relay 22 draws up its outer left-hand armature it forms an energizing circuit for relay 21. This circuit may be traced from battery 74, conductor 83, conductor 107, outer left front contact and outer left-hand armature of operated relay 22, winding of relay 21, conductor 93, normally closed contact and armature of relay 24, conductor 75 to battery 74.

As previously stated line relay 12 is operated over a circuit including the winding of relay 36. This latter relay is also energized to close a circuit through its armature and front contact to operate relay 34. The operating circuit of relay 34 may be traced from battery 55, conductor 56, winding of relay 34, conductor 117, front contact and armature of operating relay 36, conductor 60 to battery 55. The operation of relay 34 causes control relay 37 and battery 62 to be connected across line conductors 5 and 6 through its right-hand armature and contact. This circuit may be traced from conductor 5, conductor 118, winding of relay 37, conductor 119, right-hand armature and contact of operated relay 34, conductor 115, battery 62, conductor 116, normally closed right back contact and armature of relay 35, conductor 72 and line conductor 6.

The operation of relay 22 also prepares a circuit for sending the impulses to the central station to cause reversing relay 32 to apply current pulses of opposite polarity to the selector 45 at the central station. Whether the code of impulses sent in to the central station is for a closed or open indication of the switch is determined by the position of the spring 91 with respect to the contacts 90 and 120, to complete the circuit through the front or back contact of pulsing relay 13 which in turn determines whether the polarized relay 44 at central station A receives negative or positive battery on the spring 130, to light the green or red lamp. Since the spring 91 associated with power switch 17 is in engagement with the contact 120 due to the switch 17 now being in the closed position as previously described it will be seen that the energizing circuit for relay 37 connected across line conductors 5 and 6 is only completed through the front contact of pulsing relay 13. This pulsing circuit may be traced from conductor 83, conductor 82, spring 91, contact 120, conductor 106, middle left-hand armature and middle left front contact of relay 22, conductor 123, front contact and armature of pulsing relay 13, resistance 124, conductor 68, line conductor 5, relay 37, conductor 119, right-hand contact and armature of operated relay 34, battery 62, conductor 116, back contact and right-hand armature of relay 35, conductors 72, line conductor 6, conductor 71, right-hand armature and front contact of operated relay 12, conductor 105 to conductor 83.

The circuit for sending the set of impulses to the central office to indicate the change in position of switch 17 will now be described. The motor 10 is set in operation by the closing of the left-hand contact and armature of relay 12. This circuit may be traced from one side of battery 74, conductor 108, lefthand contact and armature of operating relay 12, conductor 109, winding of motor 10 to the other side of battery 74. The motor rotates shaft 110 which enters a reduction gear casing 10a to cause the shaft 111 extending to the arm 9 of the distributor 8 to revolve at a reduced speed. When the arm 9 starts rotating over the segments of the distributor a series of impulses is transmitted to the impulse relay 13. This is accomplished by the conducting brush 112 being drawn over the insulated segments and the continuous conducting ring 113 on the distributor 8.

The insulated spaced segments on the distributor 8 are strapped as shown in the drawings to produce various sets of code impulses which may be transmitted to the central office. The single distributor at substation B may be arranged to send code impulses for five groups of four switches each. For instance, the four switches 17 to 20 inclusive in switch group No. 1 associated with relay group No. 1 may have the code setting 7—5—5. The switches in group No. 2 associated with relay group No. 2 may have the code setting 7—3—7. Similarly, other groups of four switches at substation B, may have code settings as follows:

Group No. 3 _____ 9—3—5
Group No. 4 _____ 7—7—3
Group No. 5 _____ 5—7—5

Assuming the distributor 8 is started by common control relay 12 which is energized by the operation of group control relay 23, then the brush 112 passes over the first dead segments until sufficient speed is obtained. The third segment starts the series of impulses since this segment is connected to the negative side of battery 74 and due to the brush 112 being in contact with continuous ring 113, pulsing relay 13 is energized over conductors 114 and 108. As the brush 112 continues to travel over segments 4 to 10 inclusive, pulsing relay 13 is deenergized and energized successively to complete the first set of seven impulses since relay 13 is energized four times and deenergized three times. Pulsing relay 13 is held energized while the brush 112 is passing over segments 11 to 15 inclusive since these segments are strapped together and connected to negative battery. As the brush 112 passes over segments 16 to 20 inclusive pulsing relay 13 is deenergized three times and energized twice to send the second set of impulses, namely 5, to the central station. This is accomplished by pulsing relay 13 being deenergized on the sixteenth segment, energized on the seventeenth segment, due to the strapping of this segment to the negative side of battery 74, deenergized on the eighteenth segment, energized on the nineteenth segment over conductor 152, normally closed contact and outer righthand armature of relay 223 in Fig. 2A, conductors 153, 154 in Fig. 2A and conductors 107, 83 in Fig. 2 to battery 74, and again deenergized on the twentieth segment. Since segments 21 to 24 inclusive are not connected to battery 74, pulsing relay 13 will remain deenergized while the brush 112 is passing over these segments. Likewise, pulsing relay 13 will not be energized when the brush 112 passes over segment 25 on the distributor, due to this segment being connected to conductor 155 which is open at the outer righthand front contact and armature of relay 223 in Fig. 2A. Segment 26 is not connected to battery 74, therefore pulsing relay 13 will remain deenergized while the brush 112 is passing over this segment. The final set of impulses are sent to the central station when the brush 112 passes over the segments 27 to 31 inclusive since alternate segments are connected to the negative side of battery 74, therefore pulsing relay 13 will be energized when the brush 112 makes contact with segments 27, 29 and 31 and will be deenergized when the brush passes over segments 28 and 30, to complete the series of impulses 7—5—5 determined for the answer-back signal of switch 17 which has changed position as previously described. Since segments 32 to 38 are connected to battery 74 over conductor 98 and conductors 135, 136 and 137 over the normally closed contacts of common control relays 14 to 16 inclusive, relay 13 remains energized until its circuit is broken by the deenergization of group control relay 23.

Now, if a switch in group No. 2 is operated by the attendant at the central station A, in a manner similar to that described in connection with the operation of switch 17 in switch group No. 1 or changes position due to conditions on the line, the answer-back signal will be transmitted to central station A the same as a switch in switch group No. 1. However, in this instance relay group No. 2 will function instead of relay group No. 1. For example, if a switch in switch group No. 2 similar to switch 17 in group No. 1 changes to a closed position the following operations occur. The opening of the contacts at the switch deenergizes relay 221 by disconnecting the battery source 74 over a circuit from the negative side of battery 74, conductors 83, 107, 154, 153, movable arm 156, contact 157, conductor 158, inner lefthand armature and back contact of relay 222, righthand contact and armature of energized relay 221, conductor 159, normally closed contact and armature of relay 224, conductors 160 and 75 to battery 74. Relay 221 in releasing closes a circuit for the operation of group control relay 223 through its outer lefthand armature and contact, conductor 161, rear winding of relay 223, inner righthand armature and back contact of relay 223, conductor 151, inner righthand armature and back contact of relay 23, conductor 96, contact and spring 97 of distributor 8 and conductor 98 to battery. Group control relay 223 is energized and locks up through its front winding and also completes a circuit for the operation of switch control relay 222 which in operating cuts off battery to the other switch control relays 222a, 222b, and 222c over its righthand armature and back contact. Relay 223 therefore controls the selection of the particular code of impulses to be sent to the central station through disconnecting the switch control relays of other switches.

The change of the series of impulses to be sent to the central station will now be described since as previously stated the particular set of impulses for group No. 2 is 7—3—7. Assuming the required operation of the common control relay 12 in Fig. 2 over a circuit controlled by group control relay 223 in a manner similar to that described in connection with the operation of relay 23 in relay group No. 1, then the distributor brush 112 is rotated to pass over the segments of the distributor 8. The first set of impulses for switch group No. 2, namely 7, will be the same as for switch group No. 1, since there is no change in this set. The second set, namely 3, for group No. 2 is different from the second set of group No. 1 which is 5. This difference is brought about by the operation of group control relay 223 which breaks the connection at its outer righthand armature and back contact and closes a circuit between this armature and the outer front contact. Since conductor 152 connected to the nineteenth segment of the distributor is disconnected from the negative battery 74 over the opened armature and back contact of relay 223, the nineteenth segment is the same as the five succeeding segments. Therefore only three impulses will be sent to the central station A by pulsing relay 13, since this relay will be deenergized twice and energized once when the brush 112 is passing over segments 16, 17 and 18. Pulsing relay 13 is not energized again until the brush 112 reaches segment 25. This segment is connected to battery 74 over conductor 155 and the closed outer righthand armature and front contact of relay 223 so that the last set of impulses, namely 7, is transmitted to the central station when the brush 112 passes over segments 25 to 31 inclusive thereby energizing pulsing relay 13 four times and deenergizing relay 13 three times due to alternate segments being connected to the negative side of battery 74.

Fig. 4 shows diagrammatically the connection of the segments on the distributor to the group control relays associated with each group of four switches at a single substation. Relays 23 and 223 are the same as described in connection with Figs. 2 and 2A and relays 323, 423 and 523 correspond to these relays in other groups. Relay 323 is shown having contacts associated with one of the armatures connected to the tenth and sixteenth segments in order to change the series of impulses for group No. 3 to 9—3—5. Relay 423 has its contacts connected to segments 27 and 21 to change the series of impulses to 7—7—3 and the contacts of relay 523 are connected to segments 14 and 8 to change the series to 5—7—5.

In like manner each of the distributors at the other substations may be arranged to send codes of impulses differing from the distributor at substation B simply by strapping other groups of segments on the distributors to produce the desired sets of impulses. The rotating arm 9 draws the brush 112 over the segments in a clockwise direction starting at segment 1 and completing the cycle on the last segment. For convenience the segments have been numbered at spaced intervals to identify the segments in connection with the following description.

Assuming the motor is started, the shaft 111 rotates the brush 112 attached to arm 9 over the first two dead segments until it attains a uniform speed. On reaching the third segment the first series of seven pulses are begun since this is the first segment connected to the battery 74. It will be seen that when the brush 112 engages the third segment a circuit is established for the operation of pulsing relay 13. This circuit may be traced from battery 74, conductor 83, third segment of distributor 8, brush 112, continuous ring 113, conductor 114, winding of pulsing relay 13, conductor 108 to battery 74. As pulsing relay 13 is energized it draws up its armature to close a circuit through its front contact and armature thereby energizing relay 37 over a circuit hereinbefore described. When relay 37 is energized over this circuit it establishes a circuit for the operation of reversing relay 32. This operating circuit may be traced from battery 55, conductors 56 and 64, winding of relay 32, conductor 65, armature and front contact of operated relay 37 and conductor 60 to battery 55. Relay 32 in operating causes the polarity of battery 62 to be reversed through the front contacts and operated armatures of relay 32, thereby sending a current impulse over conductors 125 and 126 to the winding 127 of selector 45 to advance the wheel 128. When the rotating brush 112 on the distributor arm 9 leaves the third segment and engages the fourth segment no current will be sent over conductors 108 and 114 since this segment is open. Pulsing relay 13 will therefore deenergize which in turn will cause relays 37 and 32 to be deenergized. When relay 32 is deenergized a pulse of opposite polarity is transmitted to the winding of the selector 45 over conductors 125 and 126, due to the changed position of the armatures of relay 32. The wheel 128 of selector 45 is therefore advanced another step by this pulse of current. A further rotation of the brush to the next segment again operates the pulsing relay 13 since this segment is strapped to the third segment to which the negative side of battery 74 is connected. Relay 37 will again operate and close a circuit for the operation of relay 32 to reverse the connections of battery 62, thereby sending another pulse of current through the winding 127 of the selector 45. Further rotation of the brush 112 continues to deenergize and energize pulsing relay 13 on each alternate segment of the distributor until the brush reaches the 10th segment. It will be seen that the pulsing relay 13 has been energized four times and deenergized three times thereby causing seven pulses of current to be sent to the winding of selector 45 from the main battery source 62 at control station A. This completes the first set of impulses transmitted to central station A. This first set of impulses will step the wheel 128 of selector 45 to a position where it is held in its advanced position by the spring 130. The engagement of the wheel 128 with the spring 130 closes a circuit for the operation of relay 38 over a circuit from battery 62, conductors 125 and 131, winding of relay 38, conductor 132, spring 130, wheel 128, conductors 133, 126 and 73 to battery. Relay 38 then prepares an energizing circuit for polarized relay 44 through conductors 134 and 138. Relay 38 in operating also causes relay 39 to operate through its right-hand contact and armature and the normally closed contacts of switch 51. The energizing circuit for relay 39 may be traced from battery 55, conductor 60, right-hand armature and contact of relay 38, switch 51, winding of relay 39, conductor 56 to battery. Relay 39 is locked in its operating position by its closed contact and armature. When relay 39 locks up the alarm 50 starts ringing to inform the attendant at the central station A that a switch has changed its position and an indication of such change is being transmitted to the central station.

As the brush 112 leaves the ninth segment of the distributor and engages the 10th to 15th segments inclusive, the pulsing relay 13 is held energized by the continuous circuit provided by the strapping of these segments, thereby preventing a change in polarity of the central station battery 62. However, when the brush 112 advances over the next five segments of the distributor 8 the pulsing relay 13 is alternately deenergized and energized, thereby setting up the circuit conditions heretofore described, to again change the polarity of battery 62 to send five pulses of current to the winding of selector 45. These pulses of current step the code wheel 128 to its second advanced position where it is held by the spring 130. Returning to the distributor 8 the further rotation of the brush 112 over the open segments 21 to 26 inclusive causes no current to be supplied to the pulsing relay 13, thereby preventing any change in the polarity of battery 62. However, when the brush engages segment 27 a complete circuit is again established to operate pulsing relay 13, thereby energizing relay 37 which in turn completes a circuit for operating reversing relay 33, to send a pulse of current to the windings of selector 45. On passing over the next four segments pulsing relay 13 is alternately deenergized twice and energized twice, to complete the last set of impulses in the order of 7—5—5 as heretofore described. The arm 129 on the code wheel 128 has now reached a position where it engage the contact 46 on the selector. The last pulse of current transmitted to polarized relay 44 determines the position of the pivoted armature associated with this relay. Due to a final negative pulse of current received from battery 62 the lower winding of relay 44 remains energized and the pivoted armature is drawn toward the lower pole face of the electromagnet, thereby shifting the armature to open the upper contacts and close the lower contacts. This operation extinguishes the green lamp 42 and lights the red lamp 43, to indicate that switch 17 is now in its closed position, and completes the answer-back signal from substation B to central station A.

The brush 112 traveling over the segments from 31 to 38 inclusive continues to hold pulsing relay 13 energized since all of these segments are connected to negative battery, segments 31, 33, 35, 37 and 38 being strapped together and connected to the negative side of battery 74 over conductor 98, and the segments 32, 34 and 36 being connected to the negative side of battery 74 over their respective conductors 135, 136 and 137 and the contacts and armatures of control relays 14, 15 and 16. The brush 112 on leaving the 38th segment engages the dead segments 39, 40 and 41. On reaching the 41st segment an extension 139, of insulating material, attached to the end of the rotating arm 9 trips the spring of the closed contact 97, thereby causing control relay 23 to deenergize which in turn causes line relay 12 to open the motor circuit and stop the rotation of the arm 9 on the distributor 8. The deenergization of control relay 23 causes associate relay 22 to be returned to its inoperative position. Control relay 36 at central station A will also be deenergized due to the release of relay 12 thereby causing control relay 34 to return to normal. The opening of the circuit through the right-hand armature and contact of relay 34 removes relay 37 from across line conductors 5 and 6. The attendant at central station A breaks the alarm circuit by operating the key 51 thereby deenergizing relay 39. This completes the final operations on an answer-back signal to the central station and all the control apparatus at the central station and substation B is in normal position and free to function if another indication of a switch position is to be sent to the central office or a switch is changed in position by operating the impulse key at the central station.

The line relay 11 operates only when a substation beyond substation B is sending in a set of code impulses in which case it opens line conductor 7 through the line relay 12 to prevent any code being sent in from substation B while relay 11 is operated. Relay 11 also opens one side of the selector circuit at substation B thus preventing any of the selectors at substation B operating. The control equipment of power switches 18, 19 and 20 at substation B and the operation of a switch from central station A is similar to that described in connection with power switch 17, but in these cases the switches are operated to their closed position by turning their respective impulse keys 40a, 40b, and 40c which are connected in parallel with the key 40 for switch 17 to energize control relay 32 at central station A and cause a series of impulses, differing from the code for power switch 17, to be sent over line conductors 5 and 6 to energize the winding of either selector 29 or 30, thereby advancing the step-by-step element to its respective contact to operate the auxiliary relays 26, 27 and 28 respectively. As described in connection with auxiliary relay 25 associated with power switch 17 these relays will energize the windings of switches 18, 19 and 20 and cause them to change from their open position to a closed position. In a like manner the closing of the switches momentarily opens the battery circuit to their respective relays 21a, 21b and 21c, to cause the operation of group control relay 23 and also the associate relays 22a, 22b and 22c respectively. These relays will then determine the series of code impulses to be sent to the central office. The distributor 8 will again send the three major sets of impulses, namely 7—5—5, and two, four or six additional pulses, to cause selector 45 at the central station to be advanced to contacts 47, 48 or 49 on the selector. In effect, the series of impulses for switch 18 will be 7—5—7, for switch 19 it will be 7—5—9 and for switch 20 the series of impulses will be 7—5—11. The control relay 38 at the central station which prepares the operating circuit for the polarized relays 44 to 44c inclusive is of the slow operating type, to prevent the operation of polarized relay 44 when it is desired to operate polarized relay 44a. It will be seen, however, that when power switch 18 is operated to its closed position relay 22a in relay group No. 1 will cause control relay 14 to be energized over conductor 140 to disconnect battery 74 from the 32nd segment on the distributor through conductor 135 and the open contact and armature of operated relay 14. This causes pulsing relay 13 to be deenergized when passing over segment 32 thereby deenergizing control relay 37 connected across line conductors 5 and 6 and consequently returning reversing relay 32 to its inoperative position and cause another pulse to be sent to the winding 127 by selector 45. On reaching the 33rd segment an energizing circuit is again formed for pulsing relay 13 to cause an additional pulse to be sent to the selector 45 whereupon the arm 129 engages contact 47 to energize relay 44a, to extinguish the green lamp 42a, and light the red lamp 43a.

In a similar manner when the switch 19 operates, its associated relay 22b will operate relay 15 to cause segments 32 and 34 to be disconnected from battery 74 over conductors 135 and 136 through the open contact and armature of operated relay 15. The distributor 8 will then send the impulses, namely 7—5—9 to operate selector 45 to contact 48 and thereby change the position of relay 44b to extinguish lamp 42b and light the red lamp 43b. Power switch 20 in operating causes its associate relay 22c to energize the winding of line relay 16 over conductor 142 to disconnect the segments 32, 34 and 36 from negative battery 74 through the open contact and armature of operated relay 16. This causes the arm 129 of selector 45 to be advanced to contact 49 and thereby operate polarized relay 44c and change the signal on the indicating panel of central station A by extinguishing the lamp 42c and lighting the red lamp 43c.

The foregoing description related to changing the position of the switches at substation B by operating the keys 40, 40a, 40b and 40c to change the position of their respective switches to a closed position. Assuming the switches at substation B are all in the closed position, any or all may be changed to their open positions by operating their respective impulse keys 41, 41a, 41b or 41c and the answer-back signal will be automatically sent in to the central station A in a manner similar to the answer-back signal described in connection with the operation of the switches to their closed positions. However, under this condition the last pulse sent to the winding of selector 45 will be positive, due to the pulsing circuit associated with pulsing relay 13 being normally closed through the armature and front contact of relay 13, conductor 143, the inner left-hand armature and inner left back contact of relays 22 to 22c inclusive and the closed lower contacts and springs of the switches. When selector 45 is operated to the contacts 46 to 49 inclusive the polarized relays 44 to 46c inclusive will shift their armatures to change the indication of the lamps from a closed indication to an open indication.

*Automatic checking circuit*

Since the substation B and other substations connected to line conductors 5, 6 and 7 are located at remote points with respect to central station A it is desirable to check the various controlling circuits in the signaling system to ascertain whether all the apparatus entering into the operation of causing the change in position of the switches at a particular substation are operating efficiently and also to determine if the switches are actually in the position as indicated by the signal lamps on the panel at control station A. In accordance with this invention a single relay associated with each group of switches automatically checks the position of the switches in sequence without operating the switch, and causes the true indication to be set up at the central station. This checking feature is carried out by the attendant at the central station turning checking impulse key 40d which causes control relay 35 to operate and energize line relay 33 and alternate energization and de-energization of reversing relay 32, to send a series of impulses over line conductors 5 and 6 to energize the winding 52 of selector 53 at substation B. This series of impulses will be different from the series of impulses which operated selectors 29 and 30 at substation B so that there will be no interference with these selectors. The selector 53 will cause its arm to engage contact 54 and thereby close a circuit for the operation of checking relay 24. This circuit may be traced from battery 74, conductor 83, winding of checking relay 24, conductor 144, contact 54, arm and wheel of selector 53, spring 145, conductors 146 and 75 to battery 74. Relay 24 will be momentarily energized to open the battery circuit to all of the 21 type relays in group No. 1. As these relays deenergize they form an energizing circuit for the winding of control relay 23 over conductor 95 and this relay locks up through its inner right front contact and inner armature. Relay 23 then causes relay 22, for example, to be energized over a circuit from battery 74, conductor 75, armature and contact of deenergized relay 24, conductor 93, inner lefthand armature and contact of relay 21, conductor 103, rear winding of relay 22, righthand back contact and armature of relay 22, outer right-hand armatures and contacts of relays 22a, 22b and 22c, outer right-hand contact and armature of operated relay 23, conductor 100, right-hand armature and front contact of operated relay 12, conductor 105 to battery. Relay 22 in energizing cuts off battery to relays 22a, 22b and 22c over its right-hand armature. Of course, any of the 22 type relays may operate first depending on the resistance of the windings of the relays. In any event when one of the 22 type relays operates it cuts off battery to the other 22 type relays as previously described and the particular series of impulses for the switch are transmitted to the central station to indicate the position of the switch. When relay 22 is energized it completes a circuit for the operation of its associated relay 21 over the outer lefthand armature and contact and conductor 107. When the set of impulses are sent to the central station the arm 9 of distributor 8 breaks the battery circuit at the spring and contact 97 thereby opening the locking circuit for relays 23 and 22 which are released. This operation completes the checking of the first switch to indicate the position of the switch at the central station. It will be remembered that all the 21 type relays deenergized upon the momentary operation of checking relay 24 and since the first check is completed relay 21 is energized and relay 22 is deenergized to allow the checking of the position of other switches in the group. Now, since relay 21 is energized relay 22 cannot operate again due to the open condition of the inner lefthand armature of operated relay 21. Therefore relay 21a which remains deenergized may cause control relay 23 to operate over its outer lefthand armature and contact. The 21a relay also prepares a circuit for the operation of relay 22a and due to the operation of relay 23 battery is supplied to relay 22a which in operating cuts off battery to the other 22 type relays. The motor is started to cause the distributor arm to pass over the segments and the series of impulses for switch 18 is transmitted to the central station. In the meantime relay 21a has energized through the outer lefthand armature and contact of operated relay 22a and in operating opens the operating winding of relay 22a which is held in locked position through the front winding. When the arm 9 reaches the spring and contact 97, the battery circuit for relays 23 and 22a is opened and these relays release. Relays 21b and 21c are still in their deenergized condition to again cause the operation of group control relay 23 which places battery on the chain circuit leading to relays 22b and 22c respectively. These relays operate in turn the same as previously described in connection with relays 22 and 22a to successively cause the individual series of impulses to be sent to the central station as a check on the position of switches 19 and 20 respectively. It will be seen that group control relay 23 determines the sequence of checking the position of the four switches in group No. 1. Line relay 12 will again be energized to disconnect line conductor 6 from the other substations on the line and also start the motor 10 to cause the arm 9 on the distributor to send the first set of impulses to the central station. Since switch 17 is in an open position the last pulse transmitted to the winding of selector 45 at central station A will be positive and when the arm 129 reaches contact 46, polarized relay 44 will not be energized thereby indicating to the attendant that the indication given at central station A is correct for the switch 17 at substation B. The attendant will then operate key 51 to break down the operating circuit at the central station and the checking circuit for power switch 17 will break down when the cycle of pulses has been sent by the distributor 8 through the opening of the contact 97. Control relay 23 will be deenergized and also associated relay 22, whereupon relay 21 will remain in its normally operated position and relay 21a will cause control relay 23 to be again operated which in turn operates associate relay 22a. This relay in operating disconnects battery from relays 22b and 22c and prepares the pulsing circuit for sending the series of pulses for switch 18. This procedure is carried through in sequence until all of the switches have caused circuit conditions to be established through their closed contacts to send the required series of impulses to central station A and thereby cause selector 45 to be operated to its respective contacts. A similar checking operation can also be accomplished with the switches in group No. 2 simply by operating an impulse key at the central station similar to key 40d to send a code of impulses over line conductors 5 and 6 to advance the arm of selector 53 at substation B to the second terminal. The check control relay 224 in relay group No. 2 will be energized over conductor 162 to deenergize the 221 type relays. The position of each switch in switch group No. 2 will then be transmitted to the central station in sequence through the repeated operation of control relay 223 in the same manner as the positions of switches 17 to 20 inclusive in switch group No. 1 were transmitted.

While the controlling system has been described with respect to operating the power switches at a substation by means of the keys at the central station and receiving the answer-back signal at the central station signifying that the switches have changed their positions, this is not the only way in which the controlling system of this invention may be operated. The conditions on the power lines to which the switches 17 to 20 inclusive are connected often cause a switch to change from a closed position to an open position and this condition will be automatically indicated to the attendant at the central station in accordance with this invention. The circuit conditions set up when a switch changes position under these conditions are the same as the answer-back signal heretofore described and the sending of the pulses to the central station causes the selector 45 to be advanced to a position to change the indicating lamps associated with the switch which has changed position, thereby indicating to the attendant at the central station that a designated switch has changed its position due to some trouble on the power line.

What is claimed is:

1. In a signaling system, a plurality of groups of devices capable of assuming different positions, a variable code impulse transmitter common to all of said devices, means individual to each group of devices and operable by a device in a corresponding group changing its position for controlling the transmitter to transmit a code characteristic of the group in which the operated device is located and disconnecting the other individual group means from the transmitter, and additional means individual to each device and operated by the device changing position for characterizing the group code in a manner individual to the operated device in the group and for disconnecting the other devices in the group from the transmitter.

2. In a signaling system, a central station, a plurality of remote stations connected to said central station over a common line, a plurality of selectors connected to said line at each of said remote stations, means at said central station for operating said selectors, means at said remote station operative for sending answer-back signals over said common line, and a relay at each of said remote stations, said relay being selectively operated prior to a remote station sending answer-back signals to said central station, to disconnect said selectors at other remote stations from said central station and disconnect the selectors at the answering remote station from said central station.

3. In a signaling system, a central station, a plurality of remote stations connected to said central station over a common line, a group of switches at each of said remote stations, code responsive means energized from said central station connected to said line at each of said remote stations for operating said switches, signal receiving means at the central station, a transmitter at each remote station to send answer-back code signals over the common line to the central station to operate said signal receiving means to indicate the positions of the switches at the remote station, and means at each remote station automatically operative through a chain circuit when a switch at said remote station changes position to disconnect all of said code responsive means at the remote stations from said central station until the answer-back signals have been sent to said central station.

4. In a signaling system, a central station, a plurality of remote stations connected to said central station over a common line, a group of switches at each of said remote stations, code responsive means energized from said central station connected to said line at each of said remote stations for operating said switches, signal receiving means at the central station, a transmitter at each remote station to send answer-back code signals over the common line to the central station to operate said signal receiving means to indicate the positions of the switches at the remote station, and means at each remote station individually operative through a switch changing position at said remote station to disconnect said code responsive means at the remote stations from said central station until answer-back signals from a remote station have been sent to said central station.

In witness whereof, I hereunto subscribe my name this 21 day of December, A. D. 1927.

JOSEPH C. FIELD.